(12) United States Patent
Kadokura et al.

(10) Patent No.: US 10,941,830 B2
(45) Date of Patent: Mar. 9, 2021

(54) SHOCK ABSORBER

(71) Applicant: HITACHI AUTOMOTIVE SYSTEMS, LTD., Ibaraki (JP)

(72) Inventors: Kosuke Kadokura, Ebina (JP); Takao Nakadate, Yamato (JP); Shunsuke Mori, Yokohama (JP); Osamu Yuno, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 64 days.

(21) Appl. No.: 16/478,196

(22) PCT Filed: Jan. 16, 2018

(86) PCT No.: PCT/JP2018/000947
§ 371 (c)(1),
(2) Date: Jul. 16, 2019

(87) PCT Pub. No.: WO2018/135461
PCT Pub. Date: Jul. 26, 2018

(65) Prior Publication Data
US 2020/0032872 A1 Jan. 30, 2020

(30) Foreign Application Priority Data

Jan. 18, 2017 (JP) ............................. JP2017-006701

(51) Int. Cl.
*F16F 9/512* (2006.01)
*F16F 9/10* (2006.01)

(52) U.S. Cl.
CPC ............ *F16F 9/5123* (2013.01); *F16F 9/103* (2013.01); *F16F 9/5126* (2013.01)

(58) Field of Classification Search
CPC ......... F16F 9/5123; F16F 9/5126; F16F 9/103
(Continued)

(56) References Cited

U.S. PATENT DOCUMENTS

| 5,975,258 A * | 11/1999 | Nezu ...................... F16F 9/348 |
| | | 188/322.15 |
| 9,657,802 B2 * | 5/2017 | Kim ........................ F16F 9/48 |

(Continued)

FOREIGN PATENT DOCUMENTS

JP 2008-89044 4/2008

OTHER PUBLICATIONS

International Search Report dated Mar. 20, 2018 in International (PCT) Application No. PCT/JP2018/000947 with English translation.

(Continued)

*Primary Examiner* — Thomas J Williams
(74) *Attorney, Agent, or Firm* — Wenderoth, Lind & Ponack, L.L.P.

(57) ABSTRACT

In a shock absorber, an extension-side check valve permitting a flow of hydraulic fluid directed from a common passage to a compression-side passage side, and a compression-side orifice establishing communication between the compression-side passage and a compression-side back-pressure chamber are provided in an extension-side discharge passage. A compression-side check valve permitting a flow of hydraulic fluid directed from the common passage to an extension-side passage side, and an extension-side orifice establishing communication between the extension-side passage and an extension-side back-pressure chamber are provided in a compression-side discharge passage. A pilot valve includes a valve body slidably inserted in the common passage, and a valve spring biasing the valve body in a valve-opening direction. The valve body includes a fitting portion fitted in a passage between the back-pressure chamber on an upstream side and the common passage on a downstream side when the valve body is stroked in the valve-opening direction.

3 Claims, 7 Drawing Sheets

(58) Field of Classification Search
USPC .................................................... 188/282.3
See application file for complete search history.

(56) References Cited

U.S. PATENT DOCUMENTS

| | | | |
|---|---|---|---|
| 2003/0132073 A1* | 7/2003 | Nakadate .............. | F16F 9/3214 188/282.2 |
| 2008/0185246 A1* | 8/2008 | Park ...................... | F16F 9/3485 188/322.15 |
| 2017/0211651 A1* | 7/2017 | Jung ....................... | F16F 9/466 |
| 2019/0072148 A1* | 3/2019 | Sakai ..................... | F16F 9/348 |
| 2020/0166097 A1* | 5/2020 | Kadokura ............... | F16F 9/516 |
| 2020/0191229 A1* | 6/2020 | Mori ..................... | F16F 9/3214 |

OTHER PUBLICATIONS

Written Opinion of the International Searching Authority dated Mar. 20, 2018 in International (PCT) Application No. PCT/JP2018/000947 with English translation.

* cited by examiner

(AT THE TIME OF FAILURE) ←→ (AT THE TIME OF CONTROL)

Fig. 7

SHOCK ABSORBER

TECHNICAL FIELD

The present invention relates to a shock absorber that generates a damping force by controlling a flow of hydraulic fluid relative to a stroke of a piston rod.

BACKGROUND ART

For example, PTL 1 discloses a shock absorber including a damping force adjustment mechanism built in a cylinder. The damping force adjustment mechanism of this shock absorber includes pilot-type damping valves on both an extension side and a compression side.

CITATION LIST

Patent Literature

[PTL 1] Japanese Patent Application Public Disclosure No. 2008-89044

SUMMARY OF INVENTION

Technical Problem

The shock absorber discussed in PTL 1 has such problems that power consumption increases because a control current on a high current side is supplied to a solenoid when a soft-side damping force, which is highly frequently used, is exerted, and, further, the damping force cannot be adjusted because the damping force is fixed to a hard-side damping force at the time of a failure (a current value is 0 A).

An object of the present invention is to provide a shock absorber capable of reducing the power consumption and adjusting the damping force at the time of the failure.

Solution to Problem

According to one aspect of the present invention, a shock absorber includes a cylinder sealingly containing hydraulic fluid therein, a piston slidably inserted in the cylinder, a piston rod having one end coupled with the piston and an opposite end extending outward from the cylinder, an extension-side passage and a compression-side passage provided in the piston, an extension-side main valve provided in the extension-side passage, an extension-side back-pressure chamber configured to adjust a pressure of opening the extension-side main valve, a compression-side main valve provided in the compression-side passage, a compression-side back-pressure chamber configured to adjust a pressure of opening the compression-side main valve, a common passage configured to establish communication between the extension-side back-pressure chamber and the compression-side back-pressure chamber, and a pilot valve configured to control a flow of hydraulic fluid in the common passage. An extension-side discharge passage is formed. The extension-side discharge passage is configured to establish communication between a portion of the common passage that is located on one side closer to the compression-side back-pressure chamber with respect to the pilot valve, and a portion of the common passage that is located on one side closer to the compression-side passage with respect to the pilot valve. An extension-side check valve and a compression-side orifice are provided in the extension-side discharge passage. The extension-side check valve is configured to permit a flow of the hydraulic fluid directed from the common passage to the compression-side passage side. The compression-side orifice is configured to establish communication between the compression-side passage and the compression-side back-pressure chamber. A compression-side discharge passage is formed. The compression-side discharge passage is configured to establish communication between a portion of the common passage that is located on one side closer to the extension-side back-pressure chamber with respect to the pilot valve, and a portion of the common passage that is located on one side closer to the extension-side passage with respect to the pilot valve. A compression-side check valve and an extension-side orifice are provided in the compression-side discharge passage. The compression-side check valve is configured to permit a flow of the hydraulic fluid directed from the common passage to the extension-side passage side. The extension-side orifice is configured to establish communication between the extension-side passage and the extension-side back-pressure chamber. The pilot valve includes a valve body and a valve spring. The valve body is slidably inserted in the common passage. The valve spring is configured to bias the valve body in a valve-opening direction. The valve body includes a fitting portion and a cutout. The fitting portion is configured to be fitted in a passage between the back-pressure chamber on an upstream side and the common passage on a downstream side when the valve body is stroked in the valve-opening direction by a biasing force of the valve spring. The cutout is provided at the fitting portion. The cutout forms an orifice that establishes communication between the back-pressure chamber on the upstream side and the common passage on the downstream side when the fitting portion is fitted in the passage.

According to the one aspect of the present invention, it is possible to provide the shock absorber capable of reducing the power consumption and adjusting the damping force at the time of the failure.

DESCRIPTION OF EMBODIMENTS

First Embodiment

A first embodiment of the present invention will be described with reference to the accompanying drawings.

Figure 1:
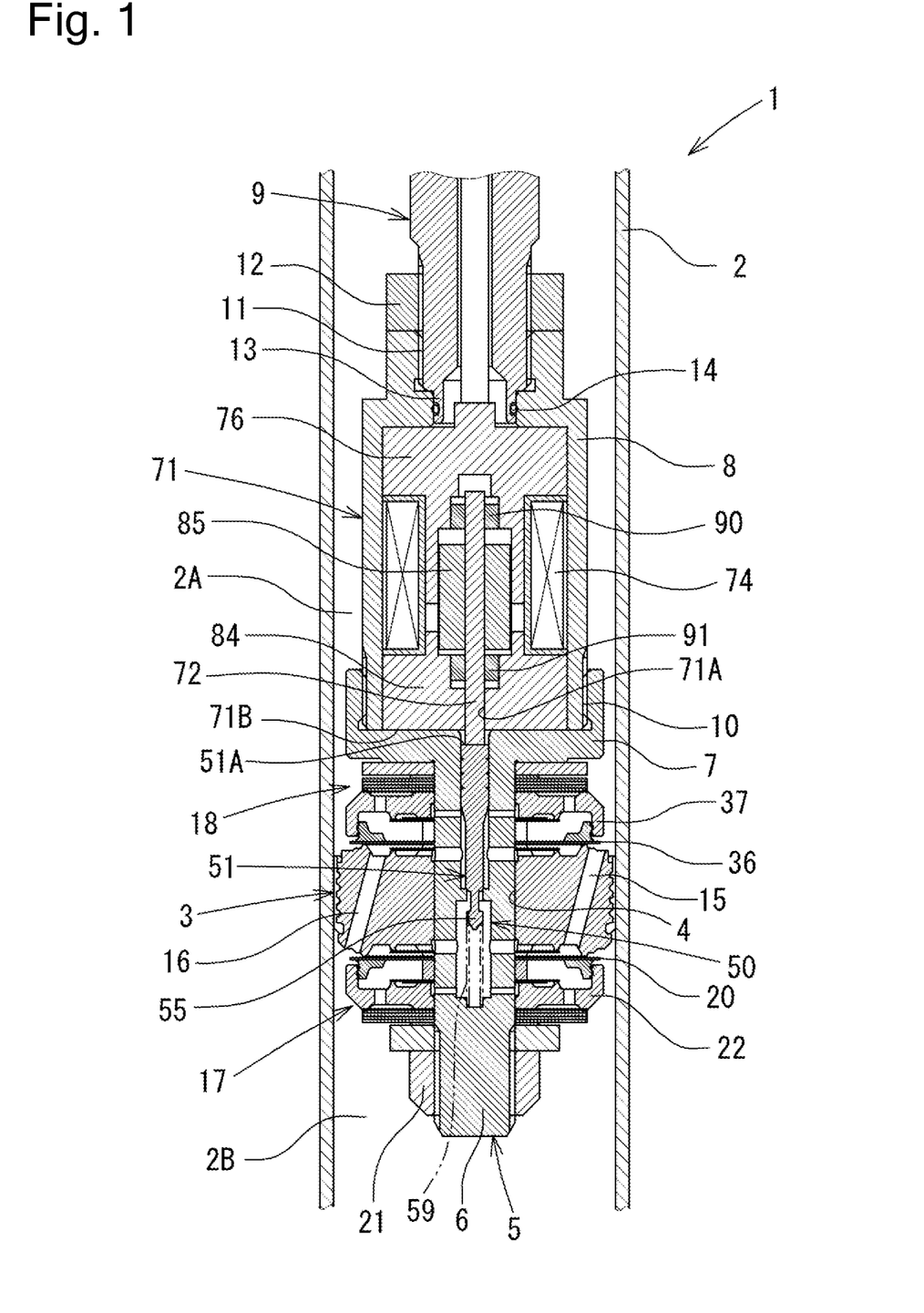
FIG. 1 is a cross-sectional view illustrating main portions of a shock absorber according to a first embodiment.

FIG. 1 is a cross-sectional view illustrating main portions of a shock absorber 1 according to the first embodiment. In the following description, an upward direction (an upper side) and a downward direction (a lower side) in FIG. 1 are defined to be an upward direction (an upper side) and a downward direction (a lower side) of the shock absorber 1, respectively. The first embodiment is a single-tube damping force adjustable hydraulic shock absorber, but can also be applied to a twin-tube damping force adjustable hydraulic shock absorber including a reservoir.

Figure 2:
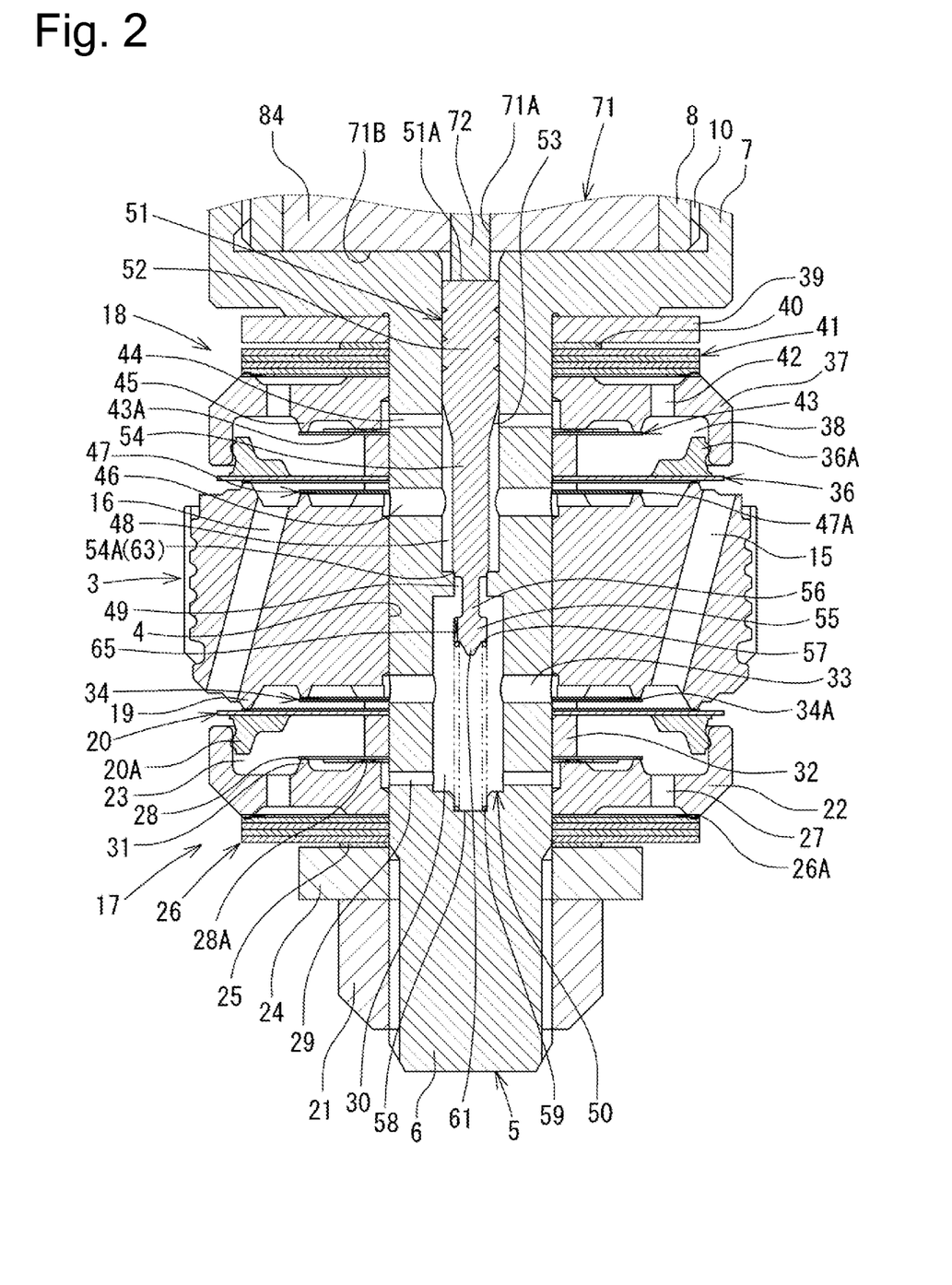
FIG. 2 illustrates a part of FIG. 1 in an enlarged manner.

As illustrated in FIG. 1, a piston 3 is slidably fitted in a cylinder 2. The piston 3 divides an inside of the cylinder 2 into two chambers, a cylinder upper chamber 2A and a cylinder lower chamber 2B. A shaft portion 6 of a piston bolt 5 is inserted through an axial hole 4 of the piston 3. A lower end portion of a generally cylindrical case member 8 is connected to a generally bottomed cylindrical head portion 7 of the piston bolt 5 via a screw coupling portion 10. An axial hole 50 (a common passage) is formed in the piston bolt 5. An axial hole 50 has an upper end opened on a bottom surface of the head portion 7, and extends toward a distal end side along a central axis. As illustrated in FIG. 2, the axial hole 50 includes an axial passage 48, an axial passage 30, and an axial passage 49. The axial passage 48 is formed at an upper portion of the axial hole 50, and has an opened upper end. The axial passage 30 is formed at a lower portion of the axial hole 50. The axial passage 49 is formed between the axial passages 30 and 48, and establishes communication between the axial passages 30 and 48. A diameter (an inner diameter) of the axial hole 50 is maximized at the axial passage 30, and is reducing in an order of the axial passage 48 and the axial passage 49.

As illustrated in FIG. 1, a lower end portion of a piston rod 9 is connected to an upper end portion of the case member 8 via a screw coupling portion 11. A nut 12 is threadably engaged with the lower end portion of the piston rod 9, and this nut 12 is fastened in abutment with the upper end of the case member 8, by which the screw coupling portion 11 is prevented from being loosened. A small-diameter portion 13 is formed at the lower end of the piston rod 9, and an O-ring 14 is attached in an annular groove formed on an outer peripheral surface of the small-diameter portion 13. The O-ring 14 seals between the case member 8 and the piston rod 9.

An extension-side passage 15 and a compression-side passage 16 are provided in the piston 3. The extension-side passage 15 has one end (an upper end) opened to the cylinder upper chamber 2A side. The compression-side passage 16 has one end (a lower end) opened to the cylinder lower chamber 2B side. An extension-side damping valve 17 is provided at a lower end of the piston 3. The extension-side damping valve 17 controls a flow of hydraulic fluid in the extension-side passage 15. A compression-side damping valve 18 is provided at an upper end of the piston 3. The compression-side damping valve 18 controls a flow of the hydraulic fluid in the compression-side passage 16.

As illustrated in FIG. 2, the extension-side damping valve 17 includes an extension-side main valve 20, a valve member 22, and an extension-side back-pressure chamber 23. The extension-side main valve 20 is seated on an annular seat portion 19 formed on an outer peripheral side of a lower end surface of the piston 3. The valve member 22 is fixed to the piston bolt 5 by a nut 21. The extension-side back-pressure chamber 23 is formed between a back surface of the extension-side main valve 20 and the valve member 22. A pressure in this extension-side back-pressure chamber 23 is applied to the extension-side main valve 20 in a valve-closing direction. A washer 24, a spacer 25, and a disk valve 26 are provided between the nut 21 and the valve member 22 in this order starting from the lower side. An inner peripheral edge portion of the disk valve 26 is sandwiched between an inner peripheral edge portion of the valve member 22 and the spacer 25. The extension-side main valve 20 is a packing valve in which an annular seal portion 20A made of an elastic member is in contact with an inner peripheral surface of the valve member 22 over an entire circumference thereof.

The extension-side back-pressure chamber 23 is in communication with the cylinder lower chamber 2B via a passage 27 formed at the valve member 22, and the disk valve 26. The extension-side back-pressure chamber 23 is constantly in communication with the cylinder lower chamber 2B via an orifice 26A formed at the disk valve 26. The disk valve 26 releases a pressure in the extension-side back-pressure chamber 23 to the cylinder lower chamber 2B by being opened when the pressure in the extension-side back-pressure chamber 23 reaches a predetermined pressure. Further, the extension-side back-pressure chamber 23 is in communication with a radial passage 29 formed in the piston bolt 5 via an extension-side back-pressure introduction valve 28 made of a disk valve. This radial passage 29 is in communication with the axial passage 30 (a common passage) formed in the piston bolt 5.

The extension-side back-pressure introduction valve 28 is a check valve that permits only a flow of the hydraulic fluid directed from the radial passage 29 to the extension-side back-pressure chamber 23. The extension-side back-pressure introduction valve 28 is seated on an annular seat portion 31 formed on an inner peripheral side of the passage 27 on an upper surface of the valve member 22. The extension-side back-pressure introduction valve 28 is sandwiched at an inner peripheral edge portion thereof between the inner peripheral edge portion of the valve member 22 and a spacer 32. When the extension-side back-pressure introduction valve 28 is opened, the extension-side back-pressure chamber 23 is brought into communication with the radial passage 29 via an orifice 28A formed at the extension-side back-pressure introduction valve 28.

The axial passage 30 is in communication with a radial passage 33 (a compression-side discharge passage) formed in the piston bolt 5. This radial passage 33 is in communication with the extension-side passage 15 via a compression-side check valve 34 provided at the piston 3. The radial passage 33 is constantly in communication with the extension-side passage 15 via an orifice 34A formed at the compression-side check valve 34. The compression-side check valve 34 permits only a flow of the hydraulic fluid directed from the extension-side passage 15 to the radial passage 33.

The compression-side damping valve 18 includes a compression-side main valve 36, a valve member 37, and a compression-side back-pressure chamber 38. The compression-side main valve 36 is seated on an annular seat portion 35 formed on an outer peripheral side of an upper end surface of the piston 3. The valve member 37 is fixed between the head portion 7 of the piston bolt 5 and the piston 3. The compression-side back-pressure chamber 38 is formed between a back surface of the compression-side main valve 36 and the valve member 37. A pressure in the compression-side back-pressure chamber 38 is applied to the compression-side main valve 36 in a valve-closing direction. A washer 39, a spacer 40, and a disk valve 41 are provided between the head portion 7 of the piston bolt 5 and the valve member 37 in this order starting from the upper side. An inner peripheral edge portion of the disk valve 41 is sandwiched between an inner peripheral edge portion of the valve member 37 and the spacer 40. The compression-side main valve 36 is a packing valve in which an annular seal portion 36A made of an elastic member is in contact with an inner peripheral surface of the valve member 37 over an entire circumference thereof.

The compression-side back-pressure chamber 38 is in communication with the cylinder upper chamber 2A via a passage 42 formed at the valve member 37, and the disk valve 41. The compression-side back-pressure chamber 38 is constantly in communication with the cylinder upper chamber 2A via an orifice 41A formed at the disk valve 41. The disk valve 41 releases a pressure in the compression-side back-pressure chamber 38 to the cylinder upper chamber 2A by being opened when the pressure in the compression-side back-pressure chamber 38 reaches a predetermined pressure. Further, the compression-side back-pressure chamber 38 is in communication with a radial passage 44 formed in the piston bolt 5 via a compression-side back-pressure introduction valve 43 made of a disk valve. This radial passage 44 is in communication with the axial passage 48 (the common passage) of the piston bolt 5.

The compression-side back-pressure introduction valve 43 is a check valve that permits only a flow of the hydraulic fluid directed from the radial passage 44 to the compression-side back-pressure chamber 38. The compression-side back-pressure introduction valve 43 is seated on an annular seat portion 45 formed on an inner peripheral side of the passage 42 on a lower surface of the valve member 37. The compression-side back-pressure introduction valve 43 is sandwiched at an inner peripheral edge portion thereof between the inner peripheral edge portion of the valve member 37 and the spacer 40. When the compression-side back-pressure introduction valve 43 is opened, the compression-side back-pressure chamber 38 is in communication with the radial passage 44 via an orifice 43A formed at the compression-side back-pressure introduction valve 43.

The axial passage 48 is in communication with a radial passage 46 (an extension-side discharge passage) formed in the piston bolt 5. This radial passage 46 is in communication with the compression-side passage 16 via an extension-side check valve 47 provided at the piston 3. The radial passage 46 is constantly in communication with the compression-side passage 16 via an orifice 47A formed at the extension-side check valve 47. The extension-side check valve 47 permits only a flow of the hydraulic fluid directed from the compression-side passage 16 to the radial passage 46.

A needle-type pilot pin 51 (a valve body) is slidably fitted in the axial hole 50 of the piston bolt 5. The pilot pin 51 forms a pilot valve together with the piston bolt 5. The pilot pin 51 includes a base portion 52, a valve portion 54, a distal end portion 55 (a fitting portion), and a connection portion 56. The base portion 52 is slidably fitted to the upper portion of the axial passage 48, i.e., a portion on an upper side with respect to the radial passage 44. The valve portion 54 is located in the axial passage 48, and is continuous with the base portion 52 via a tapered portion 53. The distal end portion 55 is located in the axial passage 30 in a state where the pilot valve is closed (refer to FIG. 2). The connection portion 56 connects the distal end portion 55 and the valve portion 54 to each other. A diameter (an outer diameter) of the pilot pin 51 is maximized at the base portion 52, and is reducing in an order of the valve portion 54, the distal end portion 55, and the connection portion 56. Further, an outer diameter of the valve portion 54 is larger than an inner diameter of the axial passage 49.

An annular spring bearing portion 57 is formed on an outer peripheral edge portion of a lower end side of the distal end portion 55 of the pilot pin 51. The pilot pin 51 is biased upward by a valve spring 59 disposed between the spring bearing portion 57 and a recessed spring bearing portion 58 formed on a bottom surface of the axial hole 50 of the piston bolt 5. By a biasing force of this valve spring 59, an end surface 52A of the base portion of the pilot pin 51 is brought into abutment with (pressed against) an actuation pin 72 of a solenoid 71, which will be described below. A circular truncated cone-shaped spring engagement portion 61 is formed inside the spring bearing portion 57 of the distal end portion 55 of the pilot pin 51.

The distal end portion 55 of the pilot pin 51 is formed into a circle including a cutoff 65 having a width across flats in cross section along a plane perpendicular to the axis. When 0 A is applied as a control current to the solenoid 71 employed as a damping force variable actuator (at the time of a failure), the pilot valve 51 is stroked in a valve-opening direction (the upward direction in FIG. 2), and the distal end portion 55 is fitted in the axial passage 49 (a passage). When the distal end portion 55 of the pilot pin 51 is fitted in the axial passage 49, a pair of orifices 62 is formed between the distal end portion 55 (the fitting portion) and the axial passage 49. The pair of orifices 62 establishes the communication between the axial passages 30 and 48 (between the back-pressure chamber on an upstream side and the common passage on a downstream side). A pair of surfaces forming the width across flats (the cutout 65) may form only one surface. In this case, the shock absorber 1 includes only one orifice 62.

An annular seat portion 63 is formed on a circumferential edge portion of an opening at an upper end (on the axial passage 48 side) of the axial passage 49. The valve portion 54 of the pilot pin 51 is seated on the seat portion 63. A tapered seating surface 54A is formed on an outer peripheral edge portion at a lower end (the connection portion 56 side) of the valve portion 54, and this seating surface 54A is seated on the seat portion 63 formed at the axial hole 50 of the piston bolt 5. In such a state that the seating surface 54A is seated on the seat portion 63 formed at the axial hole 50 of the piston bolt 5, i.e., in the state where the pilot valve is closed, the pilot pin 51 is subjected to application of a pressure on the axial passage 30 side at the distal end portion 55 via a generally circular pressure-receiving surface A (refer to FIG. 3), and application of a pressure on the axial passage 48 side at the tapered portion 53 via an annular pressure-receiving surface B (refer to FIG. 4).

As illustrated in FIG. 1, the solenoid 71 includes the case member 8, a coil 74, and the actuation pin 72, and a plunger 85 is coupled to an outer peripheral surface of the actuation pin 72. The plunger 85, which will also be referred to as a movable iron core, is formed into a generally cylindrical shape with use of a ferrous magnetic member. The plunger 85 generates a thrust force due to power supply to the coil 74 and thus generation of a magnetic force.

The actuation pin 72 is vertically (axially) movably supported by a bush 90 installed in a stator core 76 and a bush 91 installed in the core 84. The solenoid 71 includes an inner peripheral surface 71A and a lower end surface 71B, and a diameter (an inner diameter) of the inner peripheral surface 71A is smaller than a diameter (an outer diameter) of the base portion 52 of the pilot pin 51. The pilot pin 51 is subjected to restriction on an upward movement relative to the axial hole 50 of the piston bolt 5 due to abutment of the base portion 52 thereof with the lower end surface 71B of the solenoid 71.

Figure 3:
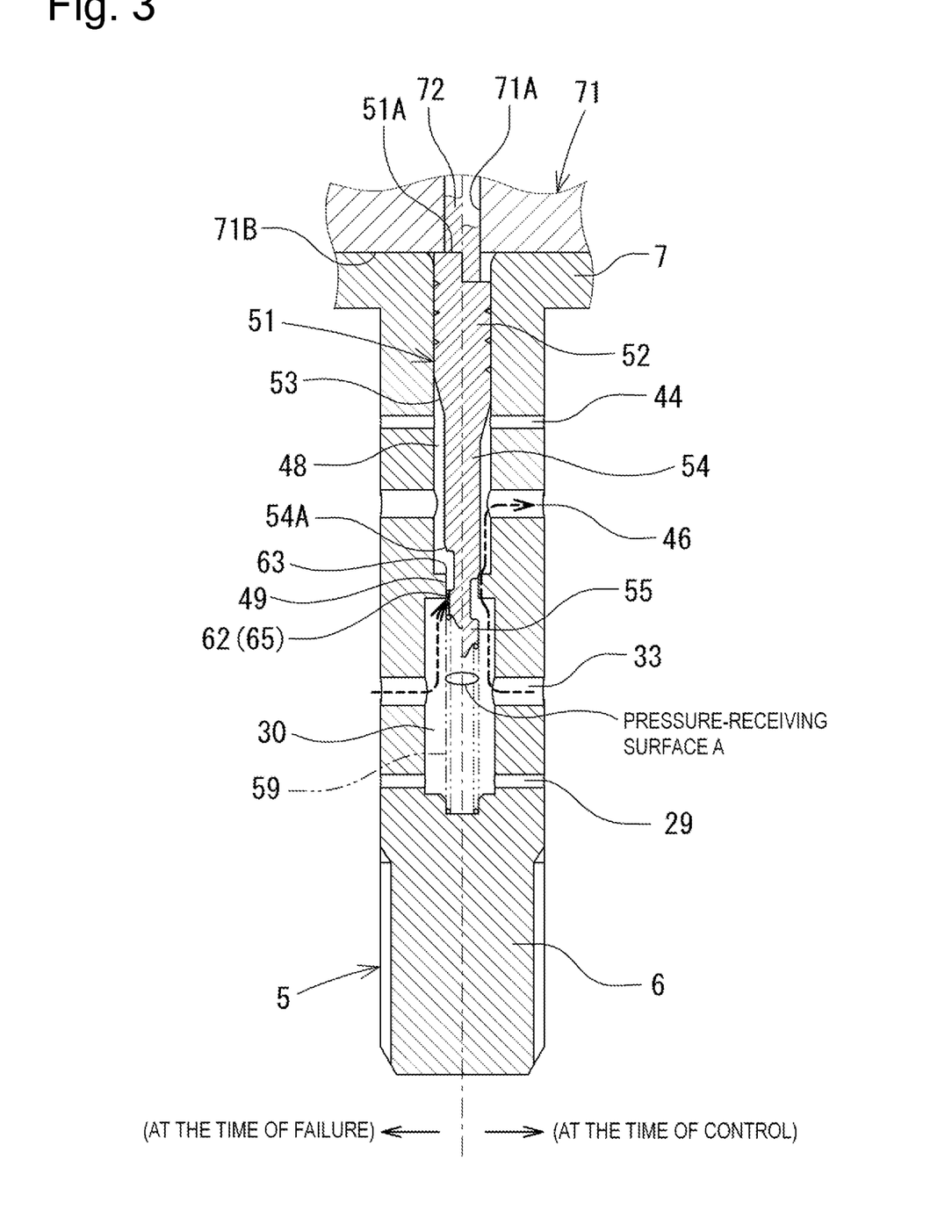
FIG. 3 illustrates an operation according to the first embodiment, and indicates a pilot flow of hydraulic fluid at the time of an extension stroke of a piston rod, and, in particular, indicates a pilot flow at the time of a failure on a left side of a central line.
Figure 4:
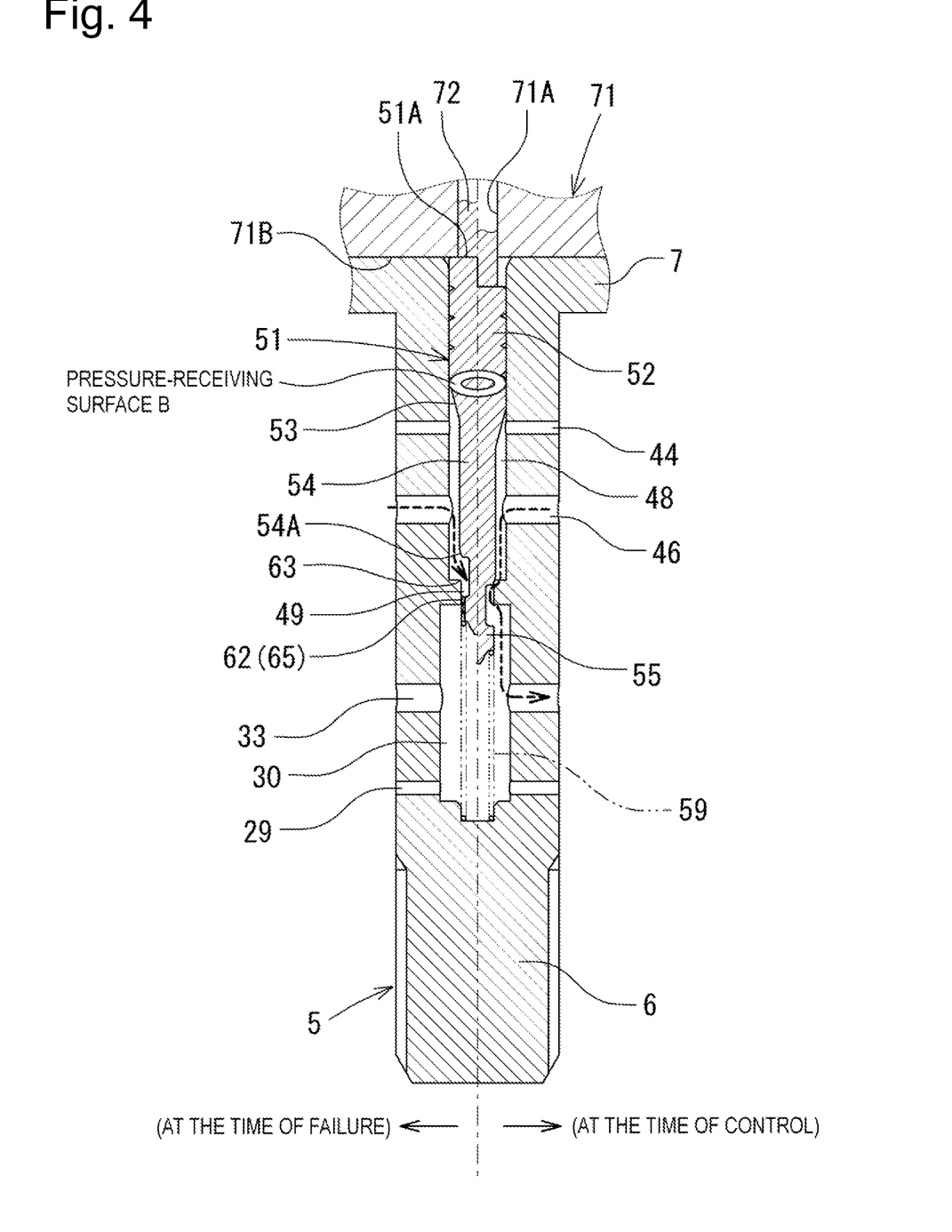
FIG. 4 illustrates an operation according to the first embodiment, and indicates a pilot flow of the hydraulic fluid at the time of a compression stroke of the piston rod, and, in particular, indicates a pilot flow at the time of the failure on a left side of a central line.

Next, an operation at the time of a failure, such as disconnection of the coil 74 of the solenoid 71 or malfunction of a controller, will be described with reference to FIGS. 3 and 4. If the thrust force of the plunger 85 is lost at the time of the failure, the pilot pin 51 is pushed up by the biasing force of the valve spring 59 and is stroked in the valve-opening direction (an upward direction in FIGS. 3 and 4). Then, the pilot pin 51 is axially positioned due to the abutment of the end surface 51A thereof with the lower end surface 71B of the solenoid 71. At the time of this failure, the distal end portion (the fitting portion) 55 of the pilot pin 51 is fitted in the axial passage 49 (the passage) of the axial hole 50 (the common passage) of the piston bolt 5, and the axial passages 30 and 48 (the back-pressure chamber on the upstream side and the common passage on the downstream side) are brought into communication with each other via the orifice 62 defined by the width across flats (the cutout 65) of the distal end portion 55.

Then, during the extension stroke at the time of the failure, a pressure (a pilot pressure) can be generated in the extension-side back-pressure chamber 23 (the back-pressure chamber on the upstream side) according to a flow passage area of the orifice 62, and thus a pressure of opening the extension-side main valve 20 can be adjusted, by adjusting the flow of the hydraulic fluid flowing from the axial passage 30 to the axial passage 48 (the common passage on the downstream side) via the orifice 62 with use of the flow passage area of the orifice 62 (the shape of the cutout 65). Further, during the compression stroke at the time of the failure, a pressure can be generated in the compression-side back-pressure chamber 38 (the back-pressure chamber on the upstream side) according to the flow passage area of the orifice 62, and thus a pressure of opening the compression-side main valve 36 can be adjusted, by adjusting the flow of the hydraulic fluid flowing from the axial passage 48 to the axial passage 30 (the common passage on the downstream side) via the orifice 62 with use of the flow passage area of the orifice 62.

Now, the shock absorber discussed in the above-described PTL 1 has such a problem that the damping force cannot be adjusted because being fixed to the hard-side damping force at the time of the failure (the current value is 0 A).

On the other hand, according to the first embodiment, the distal end portion 55 (the fitting portion) of the pilot pin 51 is fitted in the axial passage 49 and the communication is established between the axial passages 30 and 48 via the orifice 62 at the time of the failure, so that the pressures (the pilot pressures) can be generated in the extension-side back-pressure chamber 23 and the compression-side back-pressure chamber 38 according to the flow passage area of the orifice 62 and the pressures of opening the extension-side main valve 20 and the compression-side main valve 36 can be adjusted by setting the flow passage area of the orifice 62 and adjusting the flow of the hydraulic fluid flowing between the axial passages 30 and 48. As a result, appropriate damping forces can be acquired on both the extension side and the compression side even at the time of the failure.

Further, the shock absorber discussed in the above-described PTL 1 has such problems that the power consumption increases because the high current is supplied as the control current to the solenoid when the soft-side damping force, which is highly frequently used, is exerted, and, further, the damping force cannot be adjusted because being fixed to the hard-side damping force at the time of the failure.

On the other hand, in the first embodiment, the shock absorber 1 employs a so-called normally-opened type pilot valve, in which the valve portion 54 is separated from the seat portion 63 when 0 A is supplied as the control current to the solenoid 71, and therefore uses a low current as the control current to the solenoid 71 when exerting the soft-side damping force and thus reduces the power consumption.

In the following description, functions and advantageous effects of the first embodiment will be described.

According to the first embodiment, a shock absorber includes a cylinder sealingly containing hydraulic fluid therein, a piston slidably inserted in the cylinder, a piston rod having one end coupled with the piston and an opposite end extending outward from the cylinder, an extension-side passage and a compression-side passage provided in the piston, an extension-side main valve provided in the extension-side passage, an extension-side back-pressure chamber configured to adjust a pressure of opening the extension-side main valve, a compression-side main valve provided in the compression-side passage, a compression-side back-pressure chamber configured to adjust a pressure of opening the compression-side main valve, a common passage configured to establish communication between the extension-side back-pressure chamber and the compression-side back-pressure chamber, and a pilot valve configured to control a flow of hydraulic fluid in the common passage. An extension-side discharge passage is formed. The extension-side discharge passage is configured to establish communication between a portion of the common passage that is located on one side closer to the compression-side back-pressure chamber with respect to the pilot valve, and a portion of the common passage that is located on one side closer to the compression-side passage with respect to the pilot valve. An extension-side check valve and a compression-side orifice are provided in the extension-side discharge passage. The extension-side check valve is configured to permit a flow of the hydraulic fluid directed from the common passage to the compression-side passage side. The compression-side orifice is configured to establish communication between the compression-side passage and the compression-side back-pressure chamber. A compression-side discharge passage is formed. The compression-side discharge passage is configured to establish communication between a portion of the common passage that is located on one side closer to the extension-side back-pressure chamber with respect to the pilot valve, and a portion of the common passage that is located on one side closer to the extension-side passage with respect to the pilot valve. A compression-side check valve and an extension-side orifice are provided in the compression-side discharge passage. The compression-side check valve is configured to permit a flow of the hydraulic fluid directed from the common passage to the extension-side passage side. The extension-side orifice is configured to establish communication between the extension-side passage and the extension-side back-pressure chamber. The pilot valve includes a valve body and a valve spring. The valve body is slidably inserted in the common passage. The valve spring is configured to bias the valve body in a valve-opening direction. The valve body includes a fitting portion and a cutout. The fitting portion is configured to be fitted in a passage between the back-pressure chamber on an upstream side and the common passage on a downstream side when the valve body is stroked in the valve-opening direction by a biasing force of the valve spring. The cutout is provided at the fitting portion. The cutout forms an orifice that establishes communication between the back-pressure chamber on the upstream side and the common passage on the downstream side when the fitting portion is fitted in the passage. Therefore, at the time of a failure, the fitting portion of the valve body is fitted in the passage, by which the communication is established between the back-pressure chamber on the upstream side and the common passage on the downstream side via the orifice. Therefore, pressures (pilot pressures) can be generated in the extension-side back-pressure chamber and the compression-side back-pressure chamber according to a flow passage area of the orifice and pressures of opening the extension-side main valve and the compression-side main valve can be adjusted, by setting the flow passage area of the orifice and adjusting a flow of the hydraulic fluid flowing between the back-pressure chamber on the upstream side and the common passage on the downstream side. As a result, appropriate damping forces can be acquired on both the extension side and the compression side even at the time of the failure.

Further, according to the first embodiment, the shock absorber employs a so-called normally-opened type pilot valve, in which the valve portion is stroked in the valve-opening direction at the time of the failure, and therefore uses a low current as a control current to the damping force variable actuator (the solenoid) when exerting a soft-side damping force and thus can reduce power consumption.

Second Embodiment

Next, a second embodiment will be described mainly focusing on differences from the first embodiment with reference to the accompanying drawings. Portions in common with the first embodiment will be identified by the same names and the same reference numerals.

Referring to FIG. 2, in the above-described first embodiment, the shock absorber 1 establishes the communication between the axial passages 38 and 48 (between the back-pressure chamber on the upstream side and the common passage on the downstream side) via the orifice 62 by causing the distal end portion 55 (the fitting portion) of the pilot pin 51 (the valve body) to be fitted in the axial passage 49 (the passage) at the time of the failure. In other words, while the fitting portion is provided on the valve-closing direction side (the distal end side) of the pilot pin 51 with respect to the valve portion 54 of the pilot pin 51 in the first embodiment, the fitting portion is provided on the valve-opening direction side (the base portion 52 side) of the pilot pin 51 with respect to the valve portion 54 of the pilot pin 51 in the second embodiment as illustrated in FIG. 5.

Figure 5:
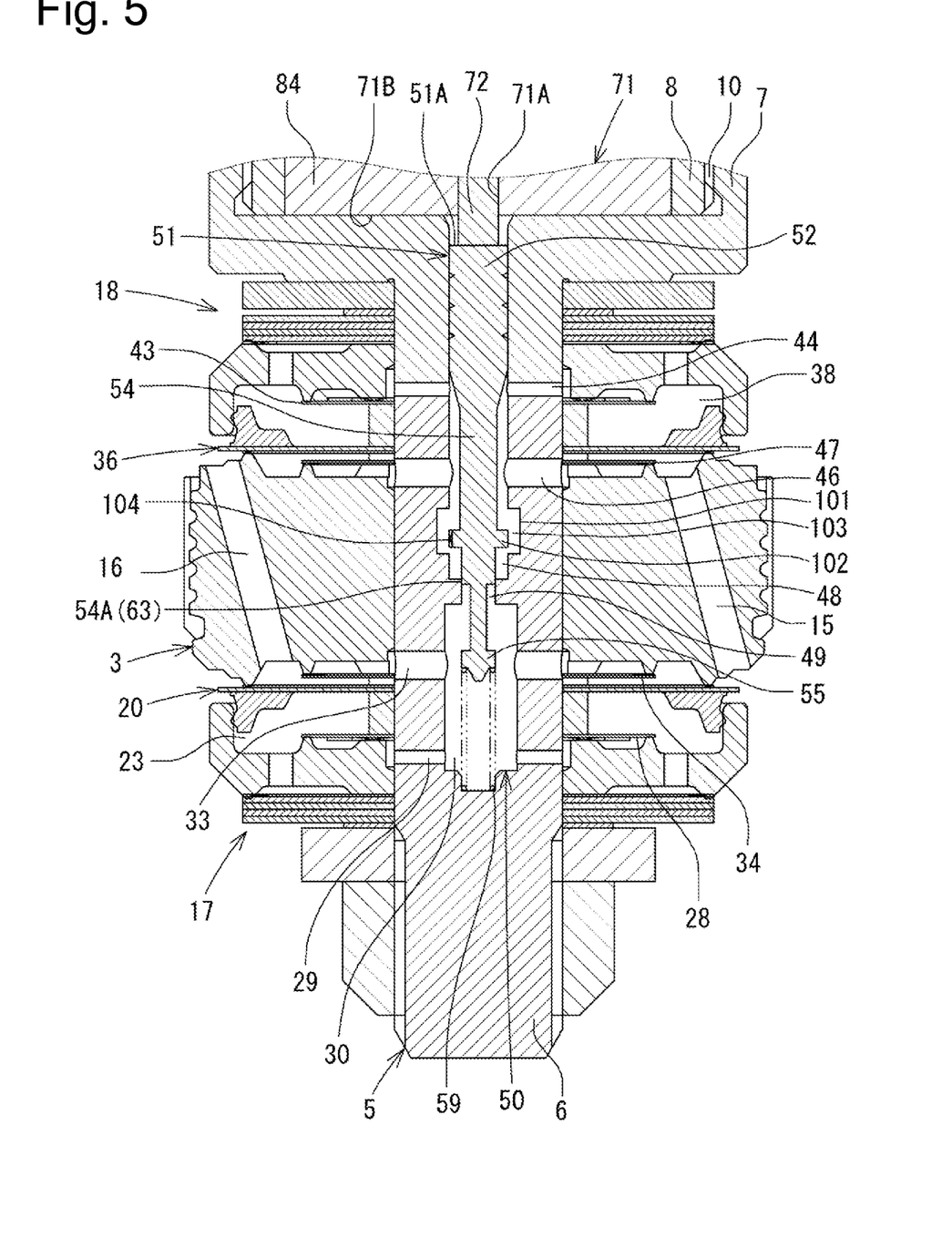
FIG. 5 illustrates a part of main portions of a shock absorber according to a second embodiment in an enlarged manner.

As illustrated in FIG. 5, a large-inner-diameter portion 101 is formed at the axial passage 48 of the axial hole 50 (the common passage) of the piston bolt 5. The large-inner-diameter portion 101 is larger in inner diameter than the diameter of the axial passage 48. This large-inner-diameter portion 101 is disposed on the axial passage 49 side (a lower side in FIG. 5) with respect to a portion on which the radial passage 46 is opened. The diameter (the inner diameter) of the large-inner-diameter portion 101 is set to a larger diameter than the diameter of the axial passage 30.

A flange portion 102 (the fitting portion) is formed on the outer peripheral surface of the valve portion 54 of the pilot pin 51 (the valve body). This flange portion 102 is formed in such a manner that an axial length thereof is shorter than an axial length of the large-inner-diameter portion 101 formed at the axial passage 48 of the axial hole 50 (the common passage). The flange portion 102 is located in the large-inner-diameter portion 101 of the axial hole 50 (the common passage) when the pilot valve is closed (refer to FIG. 5). Then, when the pilot valve is closed, the axial passage 30 and a portion of the axial passage 48 on the radial passage 46 side (an upper side in FIG. 5) with respect to the large-inner-diameter portion 101 are brought into communication with each other via an annular passage 103 formed between the large-inner-diameter portion 101 and the flange portion 102.

The flange portion 102 of the pilot pin 51 is formed into a circle including a width across flats (a cutout) in cross section along the plane perpendicular to the axis. This flange portion 102 is fitted in the lower end portion (the end portion on the axial passage 30 side) of the axial passage 48 (the passage) at the time of the failure. Then, when the flange portion 102 of the pilot pin 51 is fitted in the axial passage 48, a pair of orifices 105 (only one of them is illustrated in FIG. 5) is formed between the flange portion 102 and the axial passage 48. The pair of orifices 105 is constructed by a cutout 104 defined by the width across flats formed at the flange portion 102. This orifice 105 establishes communication between the axial passage 30 side (the lower side) and the radial passage 46 side (the upper side) of the axial passage 48. A pair of surfaces forming the width across flats of the cutout 104 may form only one surface. In this case, the shock absorber 1 includes only one orifice 105.

Figure 6:
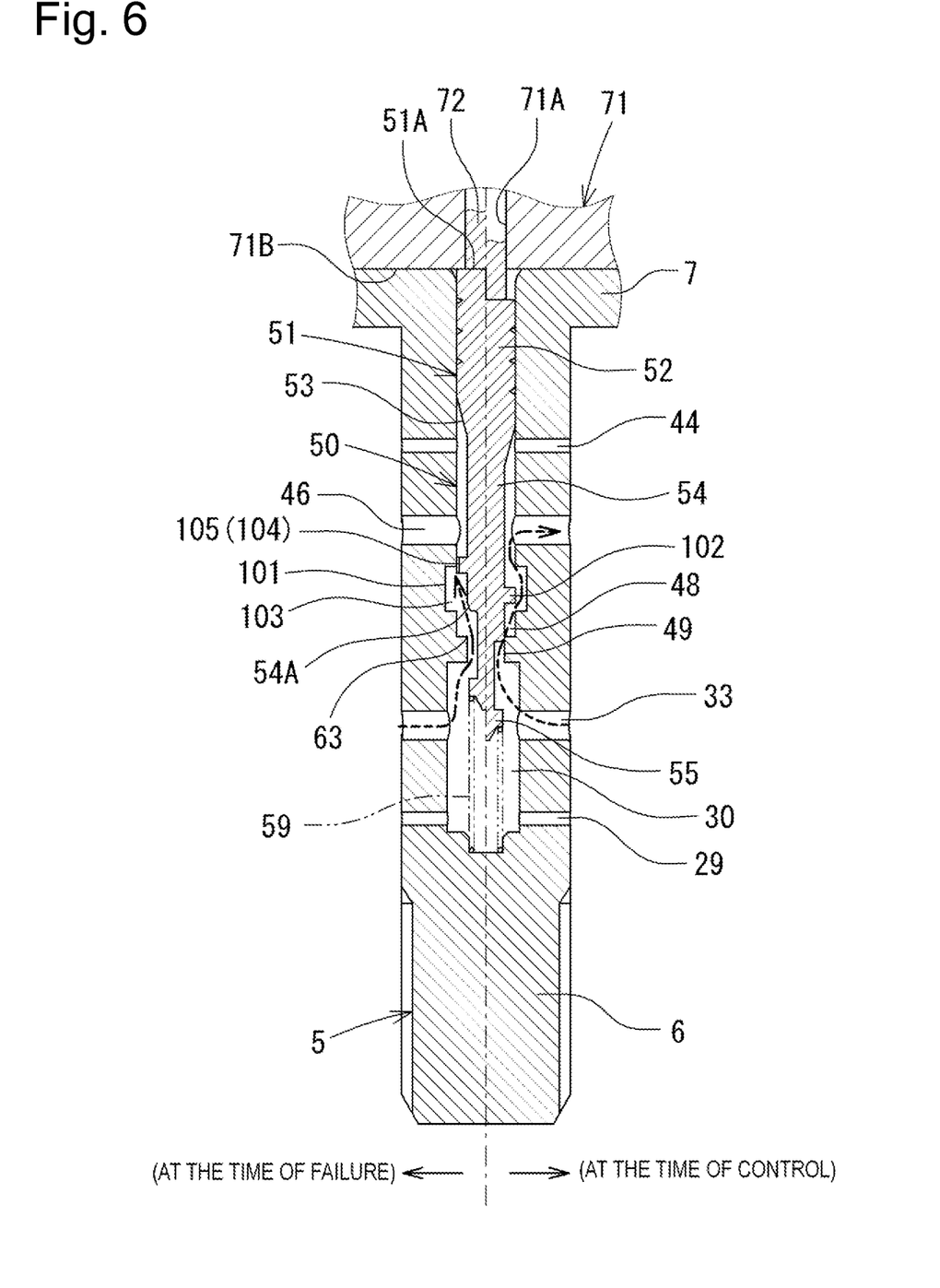
FIG. 6 illustrates an operation according to the second embodiment, and indicates a pilot flow of the hydraulic fluid at the time of the extension stroke of the piston rod, and, in particular, indicates a pilot flow at the time of the failure on a left side of a central line.
Figure 7:
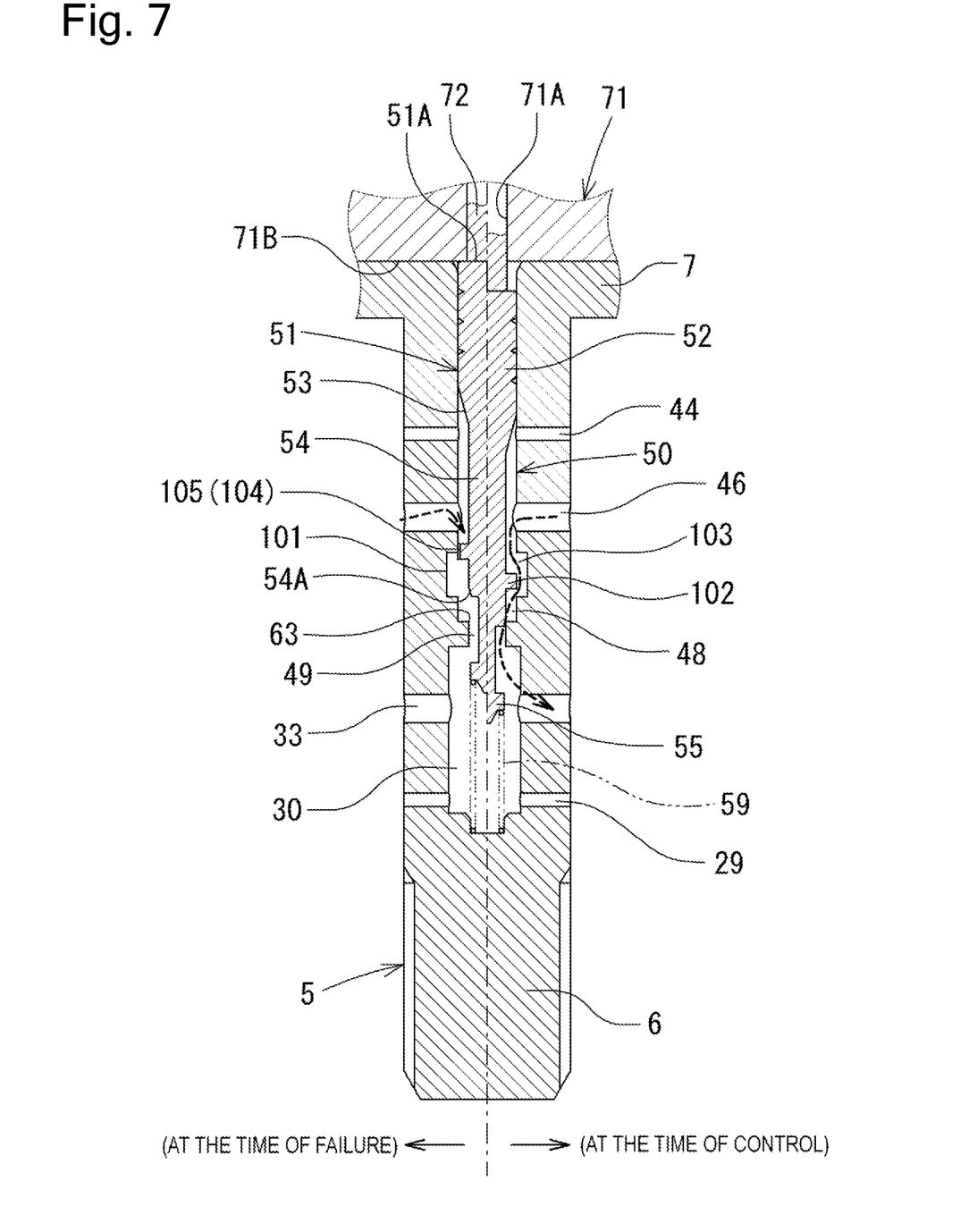
FIG. 7 illustrates an operation according to the second embodiment, and indicates a pilot flow of the hydraulic fluid at the time of the compression stroke of the piston rod, and, in particular, indicates a pilot flow at the time of the failure on a left side of a central line.

Next, an operation of the second embodiment will be described with reference to FIGS. 6 and 7.

If the thrust force of the plunger 85 (refer to FIG. 1) is lost at the time of the failure, the pilot pin 51 (the valve body) is pushed up by the biasing force of the valve spring 59 and is stroked in the valve-opening direction (the upward direction in FIG. 5). Then, the pilot pin 51 is axially positioned due to the abutment of the end surface 51A thereof with the lower end surface 71B of the solenoid 71. At the time of this failure, the flange portion 102 of the pilot pin 51 is fitted in the lower end portion of the axial passage 48 (the passage) of the axial hole 50 (the common passage) of the piston bolt 5, and the axial passage 30 and the portion of the axial passage 48 on the upper side with respect to the large-inner-diameter portion 101 are brought into communication with each other via the annular passage 103 and the orifice 105 defined by the cutout 104 of the flange portion 102.

Then, during the extension stroke at the time of the failure (refer to FIG. 6), the pressure (the pilot pressure) can be generated in the extension-side back-pressure chamber 23 according to a flow passage area of the orifice 105, and thus the pressure of opening the extension-side main valve 20 can be adjusted, by adjusting the flow of the hydraulic fluid flowing from the axial passage 30 side to the axial passage 48 side via the annular passage 103 and the orifice 105, i.e., the flow of the hydraulic fluid flowing from the extension-side back-pressure chamber 23 on the upstream side to the common passage on the downstream side with use of the flow passage area of the orifice 105 (the shape of the cutout 104).

Further, during the compression stroke at the time of the failure (refer to FIG. 7), the pressure (the pilot pressure) can be generated in the compression-side back-pressure chamber 38 according to the flow passage area of the orifice 105, and thus the pressure of opening the compression-side main valve 36 can be adjusted, by adjusting the flow of the hydraulic fluid flowing from the axial passage 48 side to the axial passage 30 side via the orifice 105 and the annular passage 103, i.e., the flow of the hydraulic fluid flowing from the compression-side back-pressure chamber 38 on the upstream side to the common passage on the downstream side with use of the flow passage area of the orifice 105 (the shape of the cutout 104).

In this manner, according to the second embodiment, the fitting portion of the valve body is fitted in the common passage and the communication is established between the back-pressure chamber on the upstream side and the common passage on the downstream side via the orifice at the time of the failure, so that the pressures (the pilot pressures) can be generated in the extension-side back-pressure chamber and the compression-side back-pressure chamber according to the flow passage area of the orifice and the pressures of opening the extension-side main valve and the compression-side main valve can be adjusted similarly to the above-described first embodiment, by setting the flow passage area of the orifice and adjusting the flow of the hydraulic fluid flowing between the back-pressure chamber on the upstream side and the common passage on the downstream side. As a result, appropriate damping forces can be acquired on both the extension side and the compression side even at the time of the failure.

Then, in the second embodiment, the fitting portion is provided on the valve-opening direction side with respect to the valve portion of the valve body, which allows the diameter (the outer diameter) of the fitting portion to be set to a larger diameter than the diameter of the valve portion. As a result, in the second embodiment, the diameter of the fitting portion can be set to a larger diameter than the diameter of the fitting portion according to the first embodiment, i.e., the diameter of the fitting portion set so as to have a smaller diameter than the diameter of the valve portion and provided on the valve-closing direction side with respect to the valve portion. Therefore, in the second embodiment, a cross-sectional area of the cutout formed at the fitting portion, i.e., the flow passage area of the orifice can be set to a larger area than that of the first embodiment, and therefore the damping force characteristic at the time of the failure can be set to a further soft side.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2017-6701 filed on Jan. 18, 2017. The entire disclosure of Japanese Patent Application No. 2017-6701 filed on Jan. 18, 2017 including the specification, the claims, the drawings, and the abstract is incorporated herein by reference in its entirety.

REFERENCE SIGN LIST

1 shock absorber
2 cylinder
9 piston rod
15 extension-side passage
16 compression-side passage
20 extension-side main valve
23 extension-side back-pressure chamber
30, 48, 49 axial passage (common passage)
33 radial passage (compression-side discharge passage)
34 compression-side check valve
34A extension-side orifice
36 compression-side main valve
38 compression-side back-pressure chamber
46 radial passage (extension-side discharge passage)
47 extension-side check valve
47A compression-side orifice
51 pilot pin (valve body)
55 distal end portion (fitting portion)
59 valve spring
62 orifice

The invention claimed is:

1. A shock absorber comprising:
a cylinder sealingly containing hydraulic fluid therein;
a piston slidably inserted in the cylinder;
a piston rod having one end coupled with the piston and an opposite end extending outward from the cylinder;
an extension-side passage and a compression-side passage provided in the piston;
an extension-side main valve provided in the extension-side passage;
an extension-side back-pressure chamber configured to adjust a pressure of opening the extension-side main valve;
a compression-side main valve provided in the compression-side passage;
a compression-side back-pressure chamber configured to adjust a pressure of opening the compression-side main valve;
a common passage configured to establish communication between the extension-side back-pressure chamber and the compression-side back-pressure chamber; and
a pilot valve configured to control a flow of hydraulic fluid in the common passage,
wherein an extension-side discharge passage, which is configured to establish communication between a portion of the common passage that is located on one side closer to the compression-side back-pressure chamber with respect to the pilot valve, and a portion of the common passage that is located on one side closer to the compression-side passage with respect to the pilot valve, is formed,
wherein an extension-side check valve and a compression-side orifice are provided in the extension-side discharge passage, the extension-side check valve being configured to permit a flow of the hydraulic fluid directed from the common passage to the compression-side passage side, the compression-side orifice being configured to establish communication between the compression-side passage and the compression-side back-pressure chamber,
wherein a compression-side discharge passage, which is configured to establish communication between a portion of the common passage that is located on one side closer to the extension-side back-pressure chamber with respect to the pilot valve, and a portion of the common passage that is located on one side closer to the extension-side passage with respect to the pilot valve, is formed,
wherein a compression-side check valve and an extension-side orifice are provided in the compression-side discharge passage, the compression-side check valve being configured to permit a flow of the hydraulic fluid directed from the common passage to the extension-side passage side, the extension-side orifice being configured to establish communication between the extension-side passage and the extension-side back-pressure chamber, wherein the pilot valve includes a valve body slidably inserted in the common passage, and a valve spring configured to bias the valve body in a valve-opening direction, wherein the valve body includes a fitting portion and a cutout, the fitting portion being configured to be fitted in a passage between the back-pressure chamber on an upstream side and the common passage on a downstream side when the valve body is stroked in the valve-opening direction by a biasing force of the valve spring, the cutout being provided at the fitting portion, and wherein the cutout forms an orifice that establishes communication between the back-pressure chamber on the upstream side and the common passage on the downstream side when the fitting portion is fitted in the passage.

2. The shock absorber according to claim 1, wherein the valve body includes a valve portion configured to be seated on a seat portion provided in the common passage, and wherein the fitting portion is provided on a valve-closing direction side with respect to the valve portion of the valve body.

3. The shock absorber according to claim 1, wherein the valve body includes a valve portion configured to be seated on a seat portion provided in the common passage, and wherein the fitting portion is provided on a valve-opening direction side with respect to the valve portion of the valve body.

* * * * *